United States Patent [19]

Skeltis et al.

[11] 3,927,621
[45] Dec. 23, 1975

[54] RAILWAY CAR HINGE-DECK LOCK

[75] Inventors: Anthony John Skeltis, Novi; Jaroslaw Joseph Rostafinski, Ferndale; Chandrakant Dhanjibhai Ravani, Farmington, all of Mich.

[73] Assignee: Portec, Inc., Oak Brook, Ill.

[22] Filed: Dec. 20, 1974

[21] Appl. No.: 536,621

[52] U.S. Cl. .......................... 105/368 R; 105/370
[51] Int. Cl.² .......................................... B61D 3/02
[58] Field of Search ......... 105/368 R, 370; 296/1 R, 296/1 A

[56] References Cited
UNITED STATES PATENTS

| | | |
|---|---|---|
| 3,230,900 | 1/1966 | Ruprecht et al. ................ 105/368 R |
| 3,405,661 | 10/1968 | Erickson et al. ................ 105/368 X |
| 3,426,704 | 2/1969 | Blunden ........................... 105/368 R |

*Primary Examiner*—M. Henson Wood, Jr.
*Assistant Examiner*—Gene A. Church
*Attorney, Agent, or Firm*—Emory L. Groff, Jr.

[57] ABSTRACT

A multi-level auto rack railway car includes a deck having an end hinge section provided with an improved locking mechanism operable to engage and lock the hinge deck sections in either an elevated or lowered position. A pre-stressed lock rod anchored to the car includes a lock plate having alternate locking portions selectively displaceable to engage a catch plate on the hinge deck section while a pre-stressed spring facilitates vertical movement of the deck section upon actuation of the lock rod.

11 Claims, 9 Drawing Figures

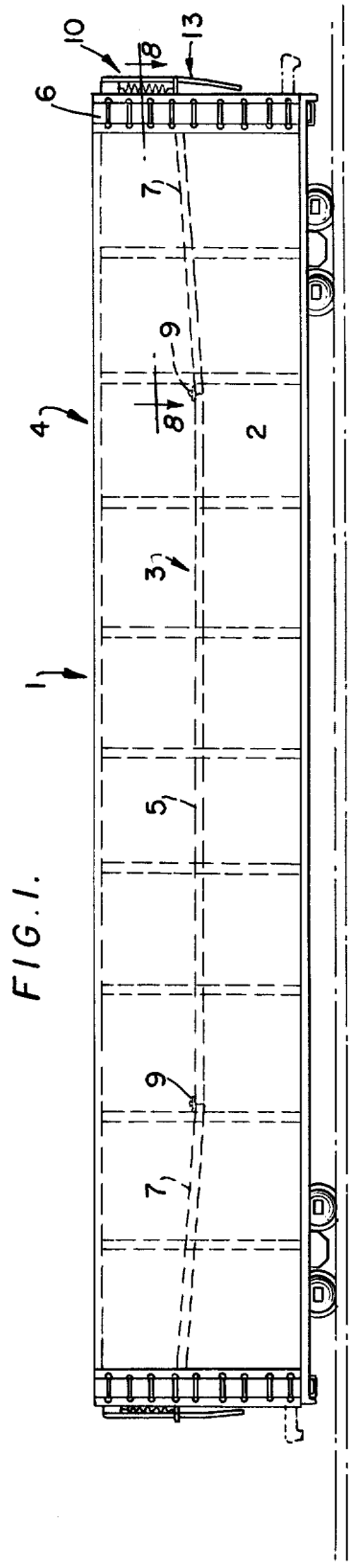
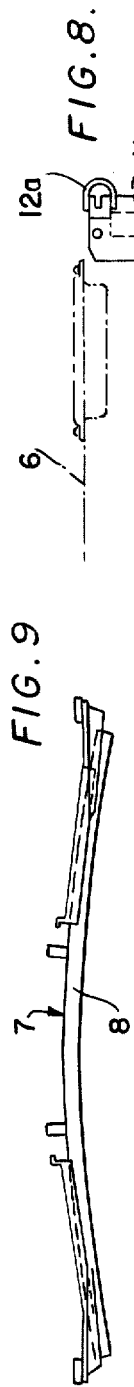
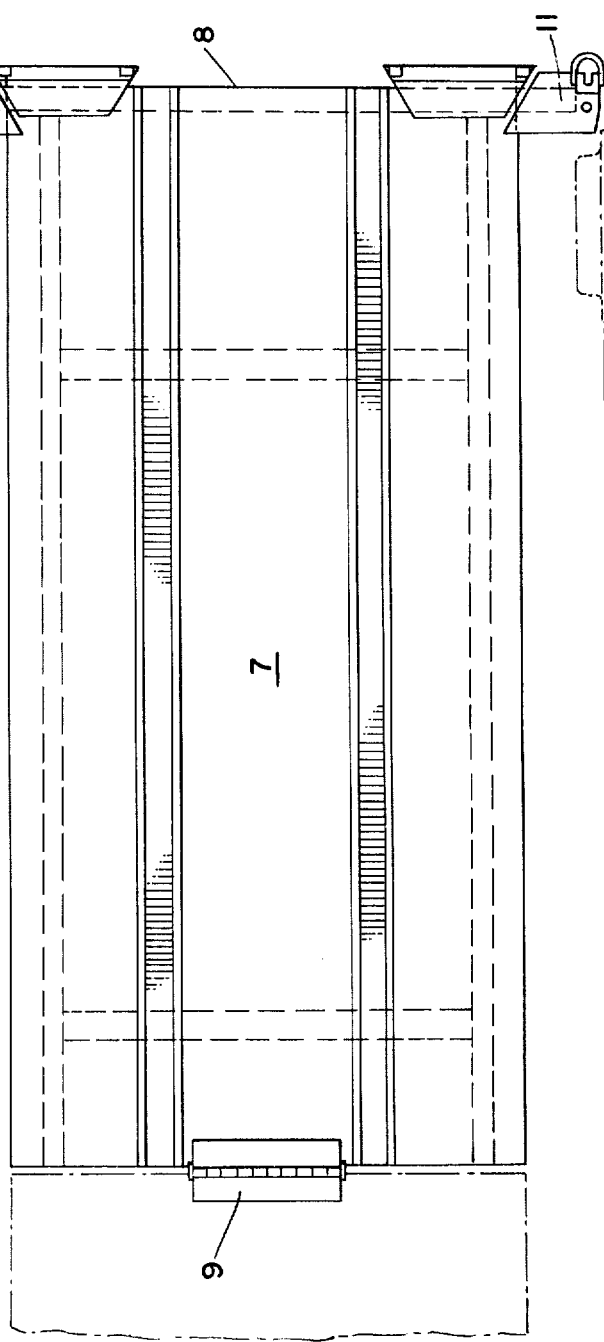

RAILWAY CAR HINGE-DECK LOCK

This invention relates generally to an improved railway car and more particularly to a multi-level auto rack car having a unique locking mechanism for the hinge deck sections of the car.

For the transportation of automobiles by railway cars, economics dictates that the maximum number of automobiles must be capable of being loaded on any one car and accordingly, the use of tri-level auto rack railway cars is now considered the standard means for transporting automobiles by rail. In order to accommodate three levels of automobiles on the car and yet remain within the allowable vertical height permitted along the track line, it is necessary to locate the middle deck at the lowest permissible height permitting of movement of standard size automobiles therebeneath. This requirement does not present any problem in the center of the car, yet it will be appreciated that at the ends of the car, in the area of the couplers, it is necessary to provide for the vertical displacement of at least the end sections of the middle deck during loading and unloading of the cars. Such a requirement is even more prevelant now that all new automobiles must be equipped with catalytic converters, which mandatory equipment significantly reduces the available clearance between the lowest point under an automobile and the bottom of the vehicle wheels.

Numerous forms of tri-level auto rack railway cars have been produced with various means to permit vertical displacement of the end sections of the middle deck thereof, yet most of these prior known arrangements have involved expensive and complicated structure to accomplish the desired displacement. One such arrangement involves an intricate cam assembly requiring the use of a separate tool for its manipulation. By the present construction, an improved mechanism is provided including a pre-stressed lock rod permanently affixed to each corner of the railway car and including a lock plate cooperating with a spring-loaded hinge deck section having a notch engaging the lock to retain the deck section in both the elevated and lowered positions.

Accordingly, one of the objects of the present invention is to provide an improved multi-level auto rack car having a pre-stressed lock rod operable to engage with and retain a hinge deck section in both an elevated and lowered position.

A further object of the present invention is to provide an improved locking mechanism for a hinge deck section of a railway car including a pre-stressed rod having a lock plate engageable within a notch on the hinge deck section to retain the deck section in either an elevated or lowered position.

Still another object of the present invention is to provide an improved locking mechanism for a railway car hinge deck section including a spring normally urging the deck section to an elevated position and cooperating with a pre-stressed lock rod having a lock plate engageable with a notch in the deck section to rigidly retain the same in either an elevated or lowered position.

Another object of the present invention is to provide an improved guiding mechanism for a railway car hinge deck section including a rod engaged within a round opening in the hinge deck section to prevent lateral and longitudinal movements of the hinge deck section.

With these and other objects in view which will more readily appear as the nature of the invention is better understood, the present invention consists of the construction, combination and arrangment of parts hereinafter more fully described, illustrated and claimed.

A preferred and practical embodiment of the invention is shown in the accompanying drawings, in which:

FIG. 1 is a side elevation of a tri-level railway auto rack car embodying the present invention.

FIG. 8 is a horizontal sectional view taken along the line 8—8 of FIG. 1.

FIG. 9 is an end elevation of the hinge deck section of FIG. 8.

Similar reference characters designate corresponding parts throughout the several figures of the drawings.

Figure 2:
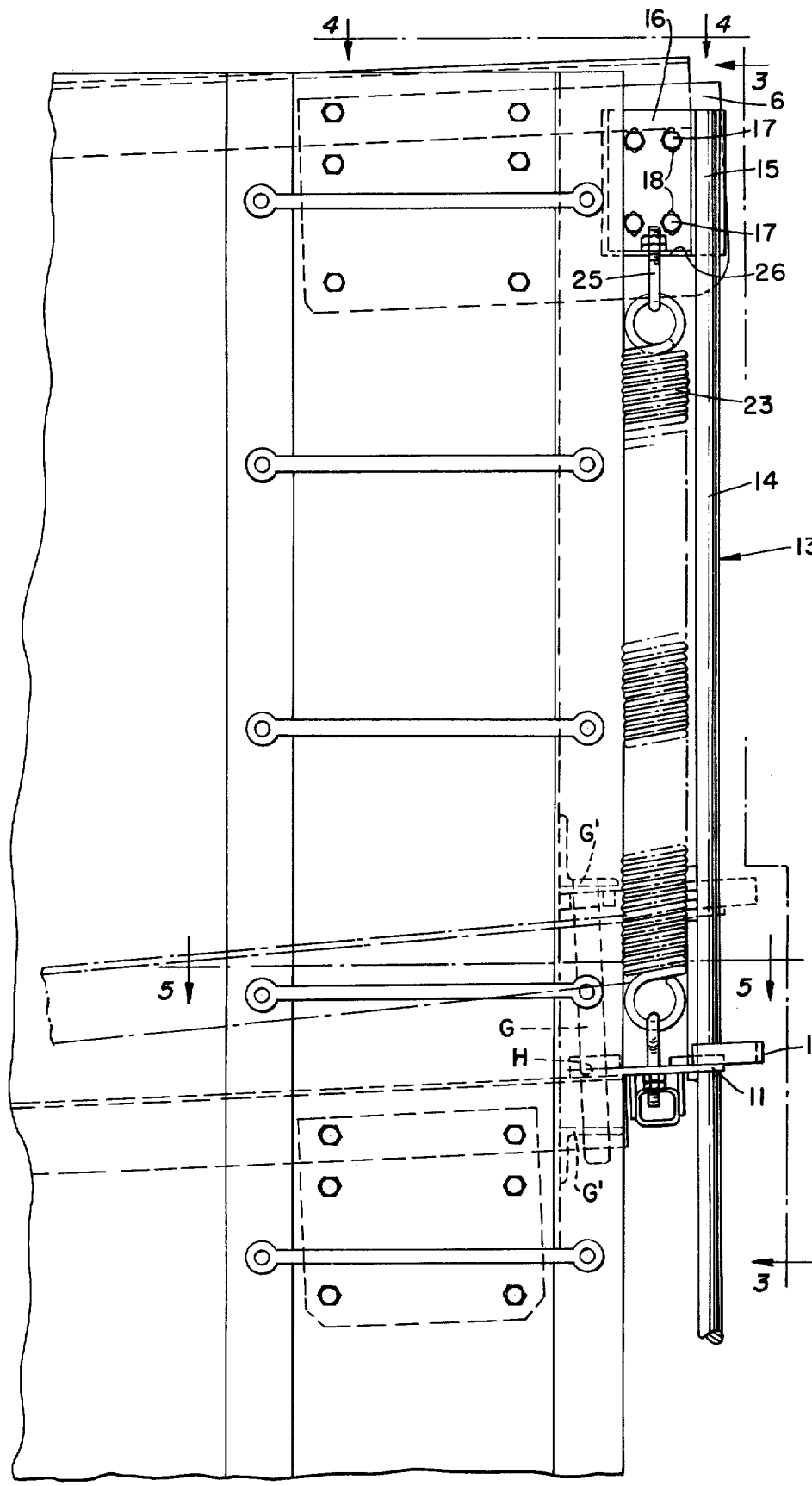
FIG. 2 is an enlarged fragmentary side elevation of the locking mechanism of the present invention.

Referring now to the drawings, particularly FIG. 1, the present invention will be seen to relate to a multi-level auto rack car, generally designated 1, having a bottom deck 2, middle deck 3 and top deck 4. The bottom deck 2 and top deck 4 will be understood to be relatively stationary while the middle deck 3 includes a center section 5 normally fixedly disposed relative the car side walls 6—6 and which cooperates with a pair of hinge deck sections 7—7, each having end edges 8 disposed adjacent the end openings of the car 1. The hinge deck sections 7 are pivotally attached to the respective ends of the center section 5 by any suitable means such as the hinges 9 permitting of at least limited vertical displacement of the hinge deck sections and edges 8 as shown by the broken lines in FIG. 1 of the drawings which reflect the alternate postions of these deck sections.

Unique means in the form of a locking mechanism, generally designated 10, are provided at the four corners of the car 1 adjacent the two end openings thereof and the specific construction of this locking mechanism 10 will be readily understood upon consideration of the following description when reviewed along with FIGS. 2-7 of the drawings.

The outer corner of each hinge deck section 7 is provided with a catch plate 11 adjacent the end edge 8 and which is formed with a notch 12 having an opening facing away from the respective end of the car. Cooperating with each notch 12 is a pre-stressed lock rod 13 having a main body 14 normally urged into and disposed fully within, the confines of the notch 12 as shown by the full line portions in FIGS. 5-7 of the drawing. The upper end 15 of the lock rod is rigidly secured, such as by welding, to a vertically adjustable mounting plate 16 which is secured in turn to the adjacent car side wall 6. This latter attachment is preferably provided by means of suitable releasable fasteners 17 disposed through vertically aligned slots 18 formed in the mounting plate 16 such that limited adjustment in the position of the mounting plate and its attached lock rod 13 may be made for reasons which will become obvious hereinafter.

The lowermost portion of the lock rod 13 is preferably bent inwardly toward the end of the car to provide a lock rod handle 19, it being understood that this handle portion is disposed at a point which is lower than the level of the hinge deck section 7 when in its lowered position and locked therein. The lock rod 13 is considered to be pre-stressed in that when properly attached to the car side by means of the mounting plate 16, the main body 14 thereof is constantly urged inwardly toward the end of the car so that its normal at-rest position without any outside interference will be one that is fully disposed within the bottom of the notch 12 of its respective catch plate 11. The limits for the locked raised and lowered positions of the end of the hinge deck section 7 are designated by means of a lock plate, generally designated 20, which is rigidly affixed to the backside of the main body 14 of each lock rod 13. The width of this lock plate 20 as defined by the lateral distance between its two vertical edges 21—21 will be seen to be significantly greater than the width of its adjacent notch 12 on the hinge deck catch plate 11 such that it is necessary to displace the vertical plane of lock plate 20 outside the confines of its respective notch 12 in order to raise or lower the adjacent hinge deck section 7.

Figure 5:
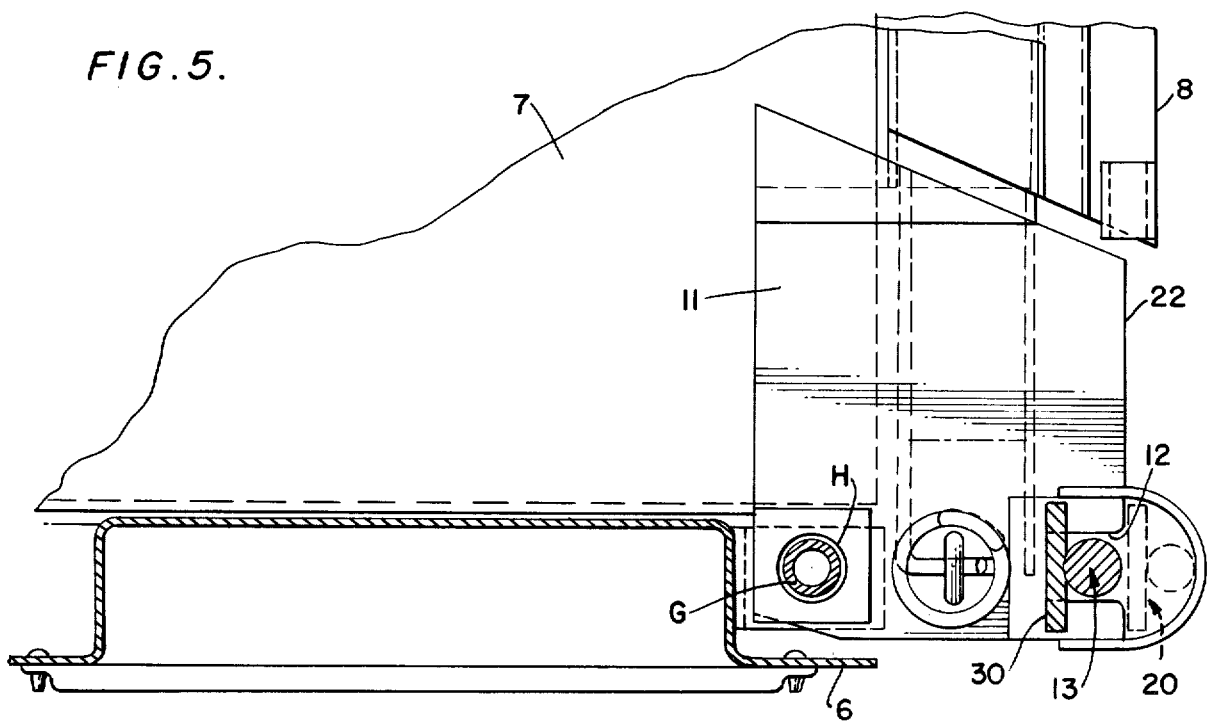
FIG. 5 is a horizontal sectional view taken along the line 5—5 of FIG. 2.
Figure 6:
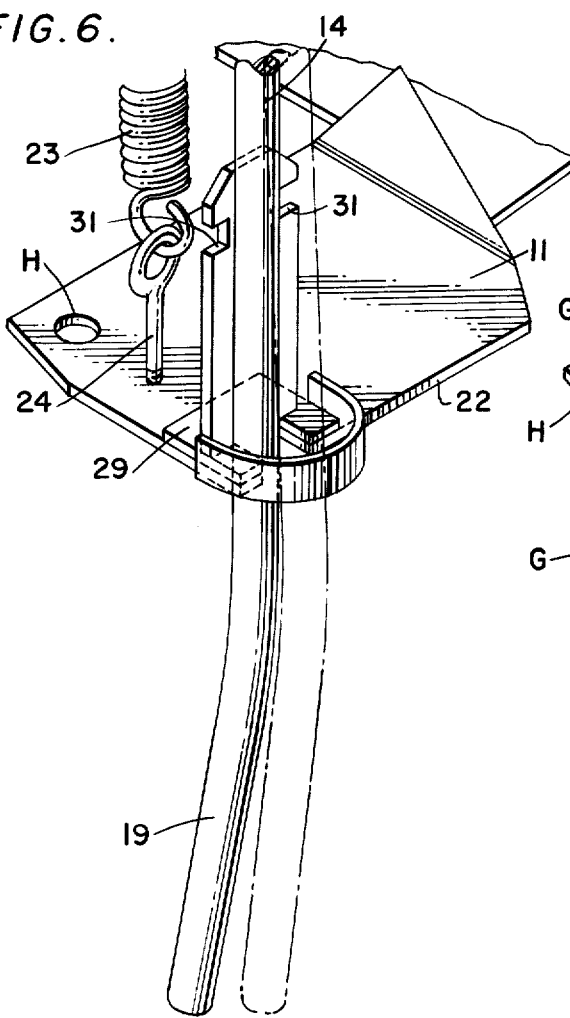
FIG. 6 is a fragmentary perspective view illustrating the hinge deck section in the lowered position.
Figure 7:
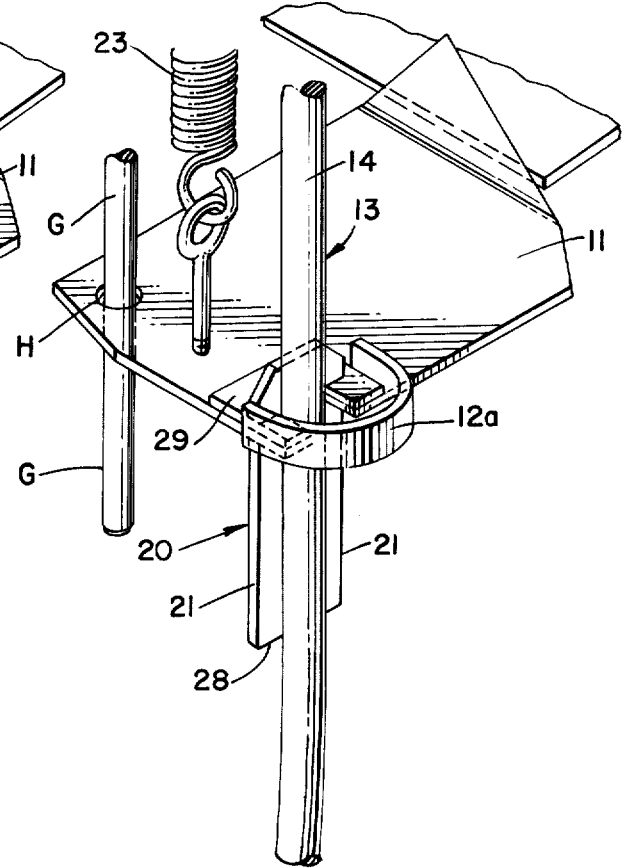
FIG. 7 is a fragmentary perspective view illustrating the hinge deck section in the elevated position.

The foregoing movement is clearly illustrated in the views of FIGS. 5–7 wherein it will be seen that upon grasping the lock rod handle 19 and pulling outwardly thereupon the stressed main body 14 of the lock rod will be moved away from the end of the car along with a corresponding outward displacement of the attached lock plate 20 until this lock plate is clear of the forward edge 22 of the catch plate 11. With the lock plate 20 thus disposed, the hinge deck section 7 is free to be vertically displaced about its hinge 9.

To facilitate the above displacement of the deck section, a lift spring 23 is attached to each catch plate 11 by means of a suitable bottom anchor member 24 while a suitable top anchor member 25 connects the upper portion of each spring to the bottom wall 26 of the vertically adjustable mounting plate 16 secured to side 6 of the car 1. The springs 23 are pre-tensioned so that when the locking mechanism 10 is displaced to the broken line position as shown in FIG. 6 of the drawings, the tension of the springs will elevate the attached hinge deck section 7 to the broken line position as shown in FIG. 2 of the drawings with a minimum of additional effort on the part of the operator.

The function of the previously described lock plate 20 will now be readily apparent. When the hinge deck section 7 is in the lowered position of FIG. 6 and the two lift springs 23 are under tension, it will be seen that the flat bottom edge 28 of the lock plate 20 engages the reinforcing plate 29 surrounding the notch 12 of the catch plate 11 while the main body 14 of the lock rod 13 is fully disposed within the deck section notch 12. On the other hand, when the lock rod handle 19 is moved outwardly away from the end of the car the flat bottom edge 28 of the lock plate 20 slides across the upper surface of the catch plate reinforcing member 29 until the lock rod is fully removed from the notch 12 and the bottom edge 28 clears the outer edges of the reinforcing plate 29 as shown by the broken lines in FIG. 5 of the drawings, at which time the tension of the two lift springs 23 causes the hinge deck section 7 to move upwardly as the forward edge 22 of the catch plate 11 slides up the rear face 30 of the lock plate 20. This upward movement of the hinge deck section continues until the pair of lateral notches adjacent the upper portion of the lock plate 20 meet with the notched out portion of the reinforcing plate 29 and catch plate 11, at which time the pre-stressed condition of the main body 14 of lock rod 13 permits the lock rod to snap backwardly to reposition the lock rod entirely within the confines of the notch 12, thereby securing the hinge deck section 7 in its elevated position. Thus it will be seen that the normal limits of travel for the hinge deck section between its two alternate positions is that distance as defined between the lateral notches 31 in the lock plate 20 and the flat bottom edge 28 thereof.

Since the only constant or positive attachment between the deck section 7 and car 1 comprises the hinge mechanism 9 at the innermost end of each deck section, it has been found desirable to provide additional specific means adjacent the forward edge 22 to preclude both lateral and longitudinal displacement of the deck section, not only when at rest in either the elevated or lowered position but also during actuation between the two alternate positions. Accordingly, a guide rod G is suitably attached in a fixed manner adjacent each end of each car side wall 6 such as by the brackets G' at both ends of the rods as shown in FIG. 2 of the drawings. As will be seen in FIGS. 5–7, the free-standing rigidly affixed medial portion of each guide rod G is disposed through an opening H of the adjacent deck section catch plate 11 and provides a close sliding fit therewith.

Surrounding the opening of each notch 12 in the catch plates 11 is a stop/limit bracket 12a which is fixedly attached to the catch plate 11 to define a cavity 12b having a width and depth outside the forward edge 22 sufficient to accommodate the lock rod main body 14 and lock plate 20 both when in the locking and released positions as shown most clearly in FIG. 5 of the drawings.

During actual displacement of the hinge deck sections 7 from the lowered to the elevated position it will be apparent that initially, a first one of the lock rod handles 19 is pulled outwardly to the disengaged position, at which time the adjacent spring 23 will only partially elevate the adjacent corner of the deck section until the other lock rod handle 19 is actuated, at which time both notches 12 may be moved into engagement with their respective lock plate notches 31.

Figure 3:
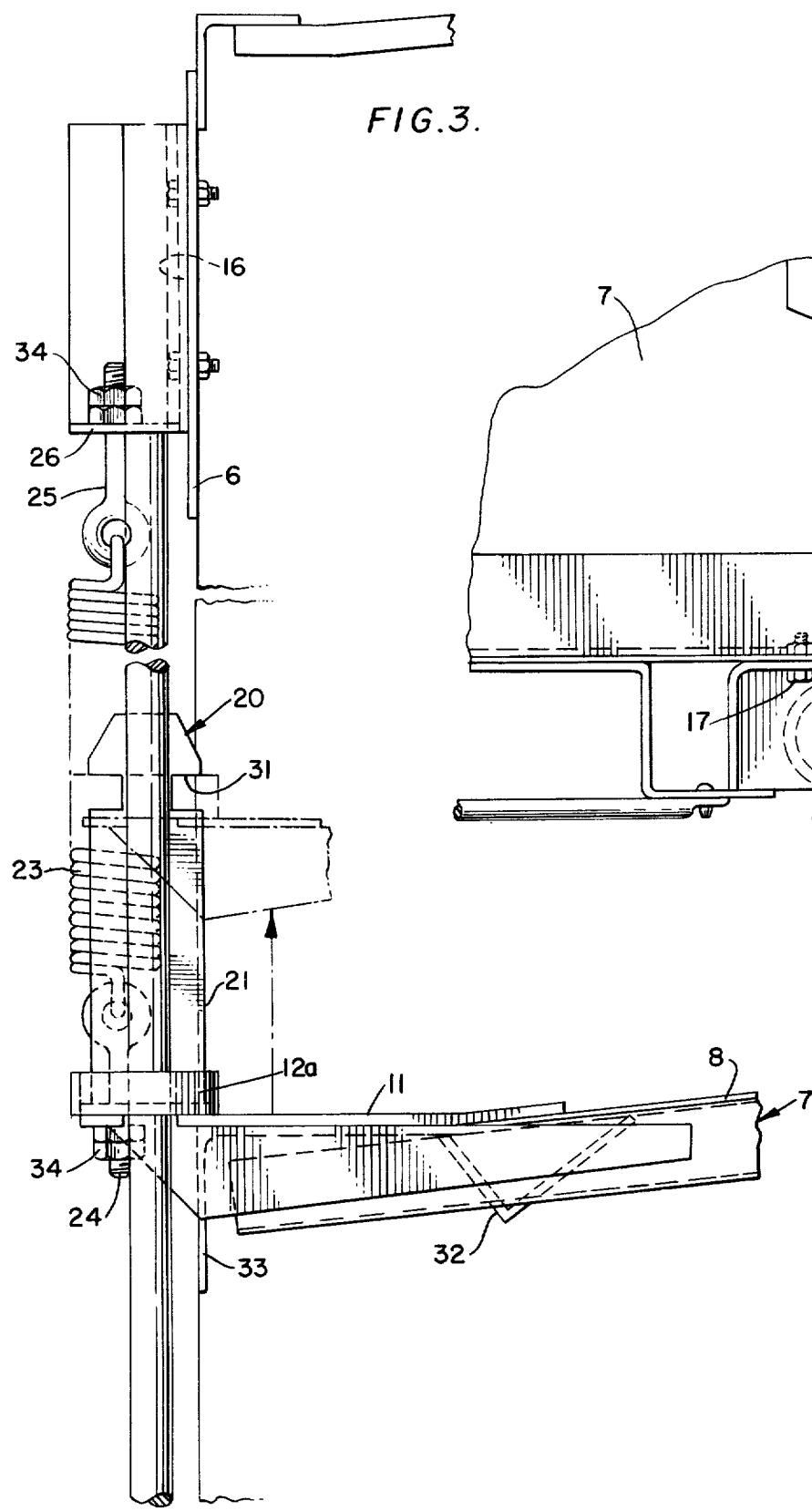
FIG. 3 is an end elevation of the locking mechanism of the present invention taken along the line 3—3 of FIG. 2.
Figure 4:
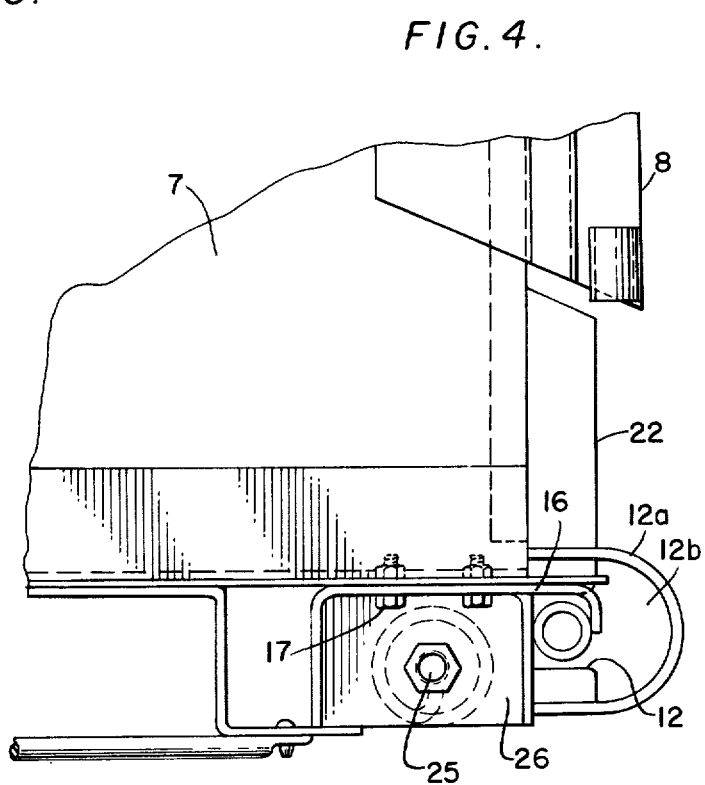
FIG. 4 is a top plan view taken along the line 4—4 of FIG. 2.

When the hinge deck section 7 is in the lowered or travel position it is supported by means of rigid stools 32 having side flanges 33 appropriately secured to the car sides 6 as shown in FIG. 3 of the drawings. The vertical adjustability of the mounting plate 16 for the locking mechanism 10 will now be appreciated inasmuch as it will be seen that when the hinge deck 7 is fully seated upon the above-mentioned stools 32 the locking mechanism may be appropriately adjusted to ensure that the bottom edges 28 of the lock plates 20 will properly engage the top of the reinforcing plates 29 as shown in FIG. 6 of the drawings. Additionally, it will be seen that the bottom and top anchor members 24 and 25 respectively may be provided with suitable adjustable fasteners 34 to permit variation of the degree of tension as afforded by the attached lift springs 23.

We claim:

1. A multi-level auto rack car includes, a middle deck disposed between two vertical side walls, said middle deck including at least one end hinge deck section having a forward edge juxtaposed one end of the car and vertically displaceable between elevated and lowered positions, a locking mechanism disposed at the ends of said side walls adjacent said hinge deck forward edge, support means fixed relative said side walls and upon which said hinge deck section is disposed when in the lowered position, said locking mechanism including a lock rod having one end attached to said car, said rod having a main body overlying said deck section forward edge, locking means on said rod main body having alternate portions selectively engageable with said deck section to retain said deck section in either the elevated or lowered positions, and spring means between said deck section and car normally biasing said deck section upwardly from its lowered position.

2. A multi-level auto rack car according to claim 1 wherein, said rod includes an upper end attached to said car and said main body depends substantially vertically from said upper end and terminates in handle portion disposed below the level of said support means.

3. A multi-level auto rack car according to claim 1 wherein, said lock rod is pre-stressed to normally bias said main body against said hinge deck section forward edge.

4. A multi-level auto rack car according to claim 1 wherein, said locking means includes a lock plate having a bottom edge portion engageable with said deck section when in the lowered position and a notched portion above said bottom edge portion engageable with said deck section when in the elevated position.

5. A multi-level auto rack car according to claim 1 wherein, said hinge deck section includes a catch plate at a corner thereof having said forward edge thereon, said forward edge provided with an inwardly directed notch, and means normally biasing said locking means into said notch.

6. A multi-level auto rack car according to claim 2 wherein, said locking means includes a lock plate having a bottom edge portion engageable with said deck when in the lowered position and a notched portion above said bottom edge portion engageable with said deck section when in the elevated position.

7. A multi-level auto rack car according to claim 2 wherein, said lock rod upper end and main body are substantially straight and said handle portion is bent inwardly toward said car.

8. A multi-level auto rack according to claim 4 wherein, said deck section forward edge includes a notch having a width less than that of said lock plate whereby displacement of said rod and lock plate away from said car permits of vertical displacement of said deck section.

9. A multi-level auto rack car according to claim 4 including, a vertically adjustable mounting plate attaching said one end of said lock rod to said car whereby the elevation of said lock plate relative said deck section when in the lowered position may be altered.

10. A multi-level auto rack car according to claim 5 including, a guide rod disposed through said deck section with both ends of said guide rod attached to said car.

11. A multi-level auto rack car according to claim 5 including, a stop bracket enclosing said notch in said deck section forward edge.

* * * * *